Aug. 11, 1959  G. A. GAGGIA  2,898,844
MACHINES FOR INFUSING COFFEE AND LIKE LIQUID EXTRACTS
Filed March 9, 1956  7 Sheets-Sheet 1

FIG.1

INVENTOR.
BY Gaggia Giov Achille

Aug. 11, 1959  G. A. GAGGIA  2,898,844
MACHINES FOR INFUSING COFFEE AND LIKE LIQUID EXTRACTS
Filed March 9, 1956  7 Sheets-Sheet 2

INVENTOR.
BY *Gaggia Giov Achille*

Aug. 11, 1959      G. A. GAGGIA      2,898,844

MACHINES FOR INFUSING COFFEE AND LIKE LIQUID EXTRACTS

Filed March 9, 1956      7 Sheets-Sheet 4

FIG. 5

INVENTOR.

FIG. 6

Aug. 11, 1959 G. A. GAGGIA 2,898,844
MACHINES FOR INFUSING COFFEE AND LIKE LIQUID EXTRACTS
Filed March 9, 1956 7 Sheets-Sheet 6

INVENTOR.

Aug. 11, 1959 G. A. GAGGIA 2,898,844
MACHINES FOR INFUSING COFFEE AND LIKE LIQUID EXTRACTS
Filed March 9, 1956 7 Sheets-Sheet 7

INVENTOR.

United States Patent Office 2,898,844
Patented Aug. 11, 1959

2,898,844

MACHINES FOR INFUSING COFFEE AND LIKE LIQUID EXTRACTS

Giovanni Achille Gaggia, Milan, Italy, assignor to Brevetti Gaggia S.r.l., Milan, Italy Application March 9, 1956, Serial No. 570,609

Claims priority, application Italy March 23, 1955

9 Claims. (Cl. 99—289)

This invention has reference to machines for infusing coffee and like liquid extracts and is particularly concerned with machines for infusing that kind of coffee which is known by the name "Expresso."

The principal object of the present invention is to provide a machine which, when once put into operation, for example by insertion of a coin or counter, by actuation of a push button, or by an electronic device such as a photoelectric cell, is capable of brewing and dispensing the desired infusion automatically.

A further object of the invention, is to provide an automatic infusing machine which, at the termination of each infusion, is capable of emptying the substance from which the infusion was brewed, from a container and of recharging the said container with a measured quantity of fresh substance.

Still another object of the invention is to provide an automatic infusing machine which is capable of grinding coffee beans or like raw material periodically into a form suitable for use in the infusing process, thereby relieving a barman or other operator of all operations, with the exception of charging the machine with the raw material, necessary for carrying out a succession of infusions and of dispensing each infusion as it is brewed.

In accordance with the said invention, a machine for infusing coffee or other liquid extract comprises a mechanism for infusing a quantity of coffee or other substance in a container and for discharging the infusion from the said container, mechanism for securing and releasing the mouth of the container to and from the said infusing and dispensing mechanism, and mechanism for displacing the container relatively to the infusing and dispensing mechanism when released from the latter, each of the said mechanisms being operable by a corresponding cam-controlled servomotor in a predetermined sequence and all the cams being operable simultaneously.

Preferably, the machine also comprises mechanism for discharging the used substance from the container after each operation of the infusing and discharging mechanism, mechanism for recharging the container with a fresh quantity of the substance to be infused and for compressing the said substance in the container, each of the said emptying, recharging and compressing mechanism also being operable by a corresponding cam-controlled servomotor of which the cams are operable simultaneously with the cams of the infusing, locking and releasing, and displacing mechanism.

If desired, the machine may include a caddy for storing a supply of the substance to be infused, a grinder for reducing raw material to a condition suitable for infusing and for supplying the ground material to the caddy, and mechanism for bringing the grinder into operation automatically as and when desired.

In order that the invention may be more readily understood and carried into practice reference will now be made to the accompanying diagrammatic drawings wherein.

The machine shown in Figures 1-7 and 9-10 of the said drawings comprises a main frame of any suitable construction, in or on which the various component parts of the machine are mounted.

The said component parts include a control mechanism (see Figures 1-4) which comprises a shaft 2 whereon a number of disc cams 1 are fixed, the said cams being so profiled and so relatively arranged that, during each complete revolution of the shaft, they actuate, through the medium of corresponding rocker arms 3, an equal number of pairs of valves in a predetermined and timed sequence.

Each of the rocker arms is pivoted by one end about a common spindle 4 carried upon a platform 5, which is fixed in the main frame parallel to the camshaft 2; the opposite end of each arm engages a guide pin 156 (see Figure 4) which is fixed upon the platform on the opposite side of the camshaft to the said spindle, and is surrounded by a coil spring 6 which is compressed between the platform and the arm. Therefore, the spring tends to turn the rocker arm about spindle 4 in the direction which maintains a nose 7, provided on the arm between the ends of the latter, in contact with the periphery of the corresponding disc cam 1.

Between the nose 7 and the pin 156, each lever arm is provided with a tappet screw 8 and an aperture 11; the tappet screw is adapted to abut the projecting end of the spring-loaded stem 9 of a corresponding inlet valve 10 housed within a valve block mounted upon the platform, whereas the spring loaded stem 12 of a corresponding exhaust valve 13, which is also housed within the said block, passes through and beyond the aperture 11. The end of the exhaust valve stem which projects beyond the lever arm, has a tappet nut 14 screwed thereon; the said tappet nut is of a length such that it spans and projects beyond the sides of the aperture 11, and it is secured upon the stem by a lock nut 15. Hence, when the rocker arm is swung about the spindle 4 against the action of the spring 6, by a corresponding cam disc 1, the stem 9 is depressed, whereas, as rotation of the cam disc permits the spring-driven return movement of the lever arm, the said arm abuts the tappet nut 14 and lifts the stem 12.

The inlet valve 10 is loaded by a compressed coil spring 16 which holds the valve against its seat 157 until the stem 9 is depressed by the tappet screw 8. Similarly, the exhaust valve 13 is loaded by a compressed coil spring 17 which holds the valve in contact with its seat 158 until the stem 12 is not raised by the spring-driven movement of the rocker arm 3. The tappet screw and tappet nut are so adjusted that the inlet valve abuts the seat 157 before the exhaust valve is lifted from its seat 158 by the spring-driven movement of the rocker arm, and the exhaust valve is returned to the seat 158 before the inlet valve is depressed from the seat 157 by the action of the cam disc 1.

Packing 18 and 20 are disposed within the valve block around the stems 9 and 12 respectively; the packing 18 is compressed by a coil spring 19 located between the said packing and the valve seat 157, and the packing 20 is compressed by the valve spring 17, so as to prevent fluid from escaping from the block past the said stems.

Unions 159 and 160 connect the working chambers of the inlet and exhaust valves respectively to a supply duct 21 of fluid under pressure, and to an exhaust duct 22 for spent fluid. A transfer duct 23 in the valve block puts the working chamber of the exhaust valve into permanent communication with a discharge chamber of the inlet valve, and a discharge duct 24 extends from the said discharge chamber.

The machine also includes mechanism for securing and releasing a coffee container 43 to and from the underside of an infusing and dispensing mechanism, mechanism for raising and lowering the said container, mechanism for transfering the container to and from an emptying and recharging table, mechanism for removing used coffee from the container, mechanism for reciprocating the table to enable the container to be recharged, and mechanism for compressing the freshly charged coffee within the container; each one of the several mechanisms is operable by a corresponding servomotor comprising either a single-acting cylinder (i.e. a cylinder in which a piston is adapted to be driven against the action of a spring by the admission of fluid under pressure to one end, the spring driving the piston in the reverse direction when the spent fluid is exhausted through the said end) or a double-acting cylinder (i.e. a cylinder in which a piston is adapted to be driven by the admission of fluid under pressure to either end whilst spent fluid is being exhausted from the opposite end); the fluid under pressure is fed to and exhausted from each single acting cylinder through a corresponding one of the discharge ducts 24 and under the control of one of the said pairs of inlet and exhaust valves, and fluid under pressure is fed to and exhausted from the ends of each double acting cylinder through two corresponding discharge ducts 24 under the control of two of the said pairs of inlet and exhaust valves. Hence, either one or two pairs of valves, one or two rocker arms, and one or two cam discs are incorporated in the machine for each of the several mechanisms referred to above. In the machine shown in Figures 1-7 and 9-10, the servomotor of the container securing and releasing mechanism comprises a double acting cylinder 44 (Figures 1 and 5), the container lifting and lowering mechanism comprises a single acting cylinder 64 (Figure 6), the infusing and dispensing mechanism comprises a single acting cylinder 146 (Figure 6), the container transfer mechanism comprises a double-acting cylinder 78 (Figures 1 and 5), the container emptying mechanism comprises a single acting cylinder 106 (Figure 9), the table reciprocating mechanism comprises a double acting cylinder 93 (Figure 7), and the compressing mechanism comprises a single acting cylinder 132 (Figure 9), so that the machine includes ten pairs of valves 10, 13, ten rocker arms 3, and ten cam discs 1 which are fixed side-by-side upon the camshaft 2, the said discs being so shaped that, during each revolution of the said shaft, the several inlet and exhaust valves are opened and/or closed at least once and in a predetermined timed sequence, fluid under pressure is fed from the supply duct 21 to each single-acting cylinder or to each end of each double acting cylinder through the corresponding discharge duct 24, and spent fluid is exhausted from the said cylinder or cylinder end through the same discharge duct and the corresponding transfer duct 23, to the exhaust duct 22, to operate the several mechanisms in the desired sequence.

Figure 6:
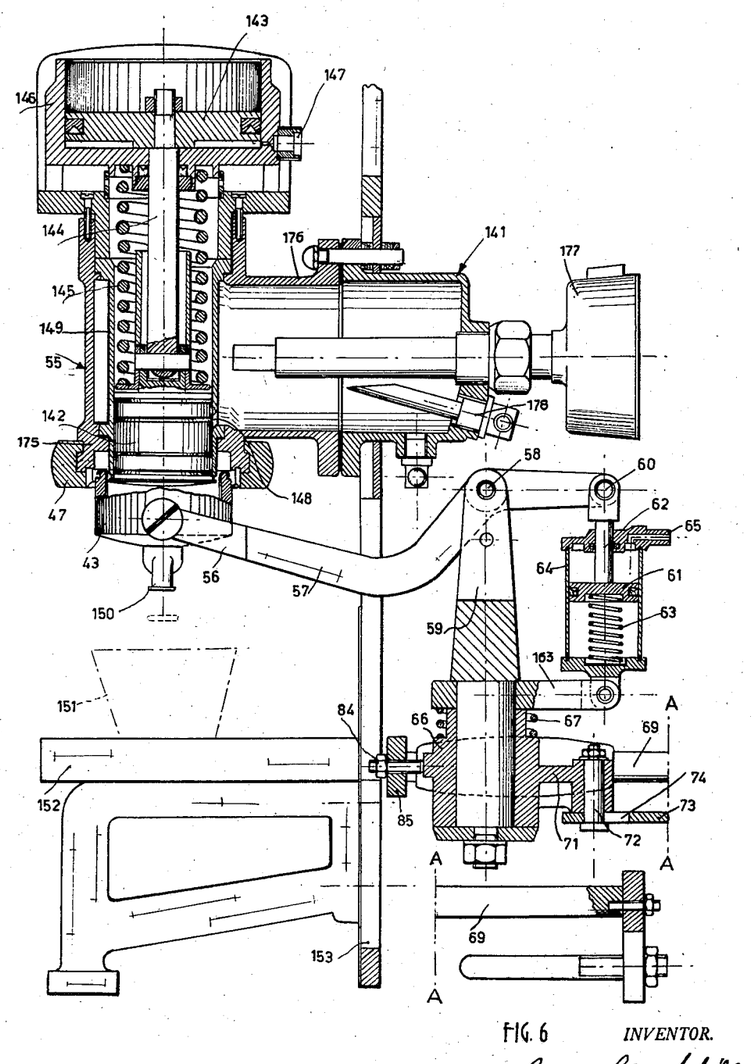
Figure 6 is a sectional elevation of an infusing and dispensing mechanism forming a part of the machine which is not shown in Figure 1.
Figures 7, 8:
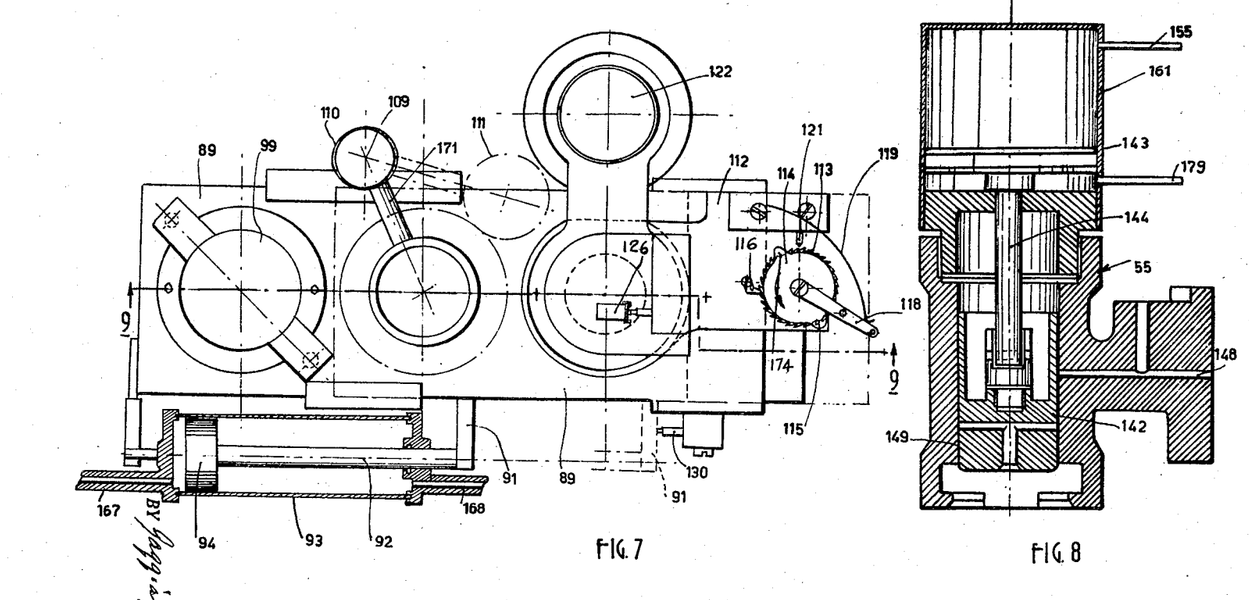
Figure 7 is a plan, partly in section, of another part of the machine which is not shown in Figure 1.
Figure 8 is a sectional elevation of a modified or alternative means for operating an infusing and dispensing mechanism forming part of the machine.

It will, of course, be appreciated that any one of the single acting cylinders may be replaced by a double acting cylinder, and any one of the double acting cylinders may be replaced by a single acting cylinder, provided that the number of pairs of valves in the machine, the number of rocker arms, and the number of discs upon the camshaft, are suitably altered. For example, Figure 8 shows a double acting cylinder 161 which may replace the single acting cylinder 146 (Figure 6) incorporated in the infusing and dispensing mechanism.

The camshaft 2 is adapted to be rotated by an electric motor 25 (see Figures 1 and 2) mounted upon the platform 5. The motor shaft 26 is provided with a worm 28 which meshes with a worm wheel 29 fast upon one end of a drive-transmitting shaft 27 journalled in bearings 30, 31 fixed upon the said platform; in the vicinity of the bearing 30, the drive-transmitting shaft is provided with a worm 34 (see Figure 4) which meshes with a worm wheel 35 fast upon a countershaft 32; the countershaft is located at one end and co-axially of the camshaft and is journalled in a bearing 33 fixed upon the platform; hence, when the motor is started and allowed to run continuously, the countershaft is rotated continuously through the speed reduction gearing formed by the two worms and worm wheels; however, the countershaft 32 is coupled to the camshaft 2 by a coupling means which, after rotating the camshaft through a complete revolution, automatically severs the drive between the two shafts (32, 2) so that the camshaft 2 comes to rest although the countershaft continues to rotate.

Figure 1:
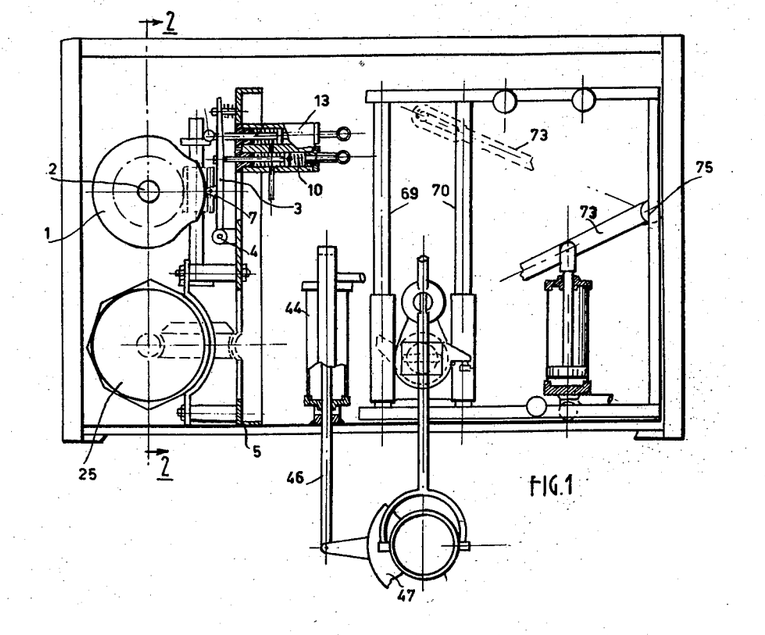
Figure 1 is a plan, partly in section, of a coffee making and dispensing machine, certain parts having been omitted for the sake of the clarity.
Figures 2, 3:
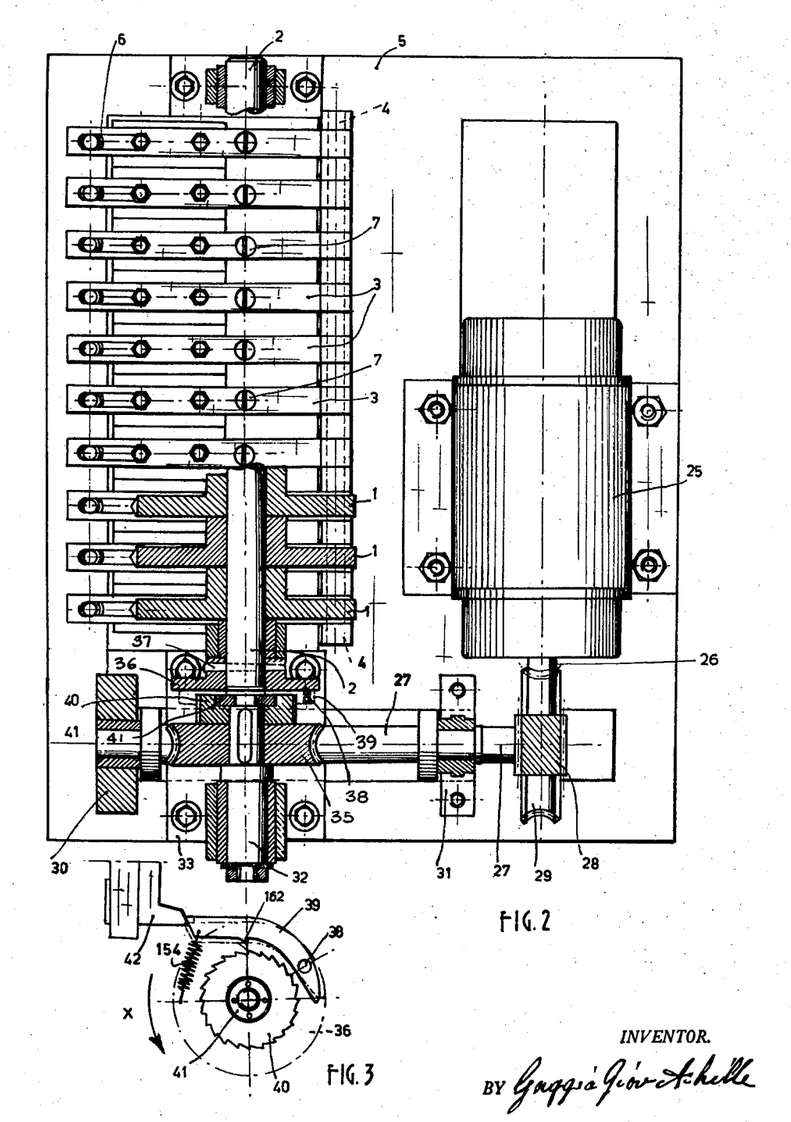
Figure 2 is an elevation, on an enlarged scale and partly in section along the line 2—2, Figure 1, of the control mechanism of the machine.
Figure 3 is a plan of a detail of the mechanism shown in Figure 2.
Figure 4:
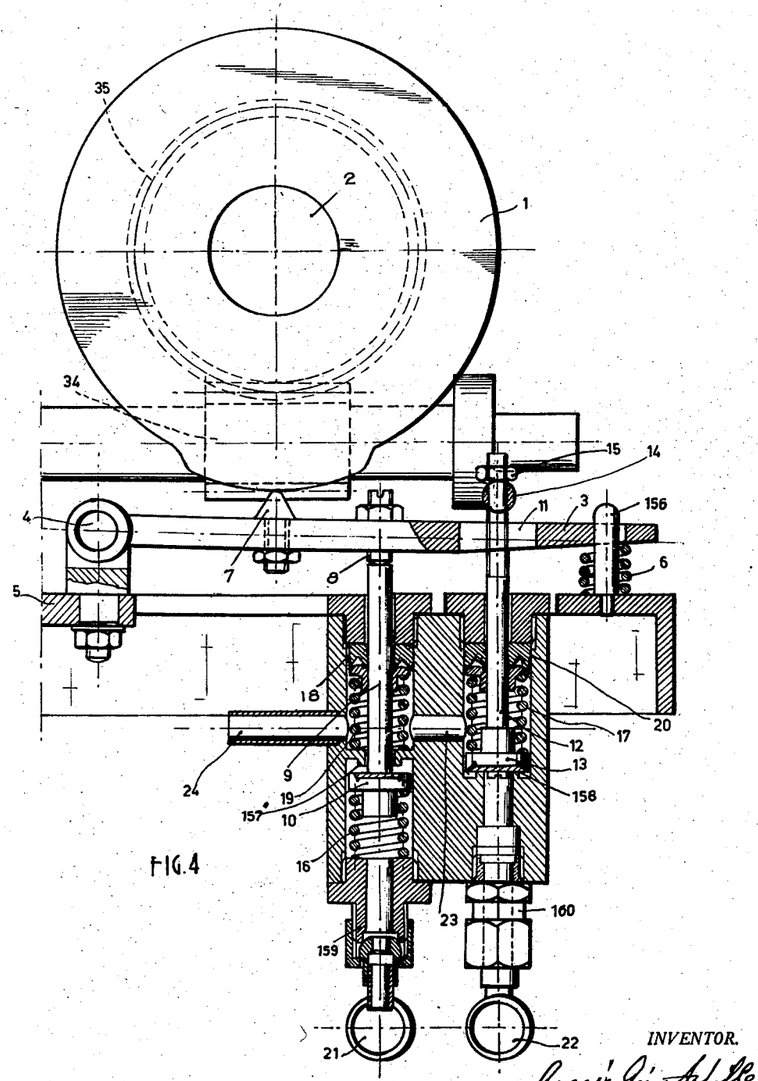
Figure 4 is an enlarged scale view of one part of the machine shown in Figure 1.

As shown in Figures 2 and 3, the said coupling means comprises a collar 36 which is secured to the camshaft 2 by a pin 37 and is provided on its face adjacent the countershaft 32 and in the vicinity of its periphery, with a stud 38 whereon a pawl 39 is pivoted. The pawl is loaded by a tension spring 154 which is anchored to and between the collar and the pawl and tends to rotate the pawl about the stud in the direction which takes a nose 162 on the pawl edge into engagement with a ratchet wheel 40 fixed upon the adjacent end of the countershaft by a locknut 41. To disengage the nose 162 from the ratchet wheel 40, the spring-loaded end of the pawl is formed with an inclined edge which co-operates with a similar inclined edge of a slide 42; the slide may be operated by any known means such as an electromagnet to which a current impulse may be supplied upon inserting a coin or counter into the machine, depressing a push button or actuating an electronic device such as a photoelectric cell, whereby it is energized so as to disengage the slide from the pawl and enable the spring to pull the pawl into engagement with the ratchet wheel, the slide being returned to its initial position after the said engagement has been effected so that it is abutted by the pawl at the end of a revolution of the said wheel and the camshaft in the direction of the arrow x (Figure 3), whereupon the engagement is severed automatically by relative movement between the abutting inclined edges of the pawl and slide, and the camshaft comes to rest. During the revolution of the camshaft and the cam discs fixed thereon, the machine performs a complete cycle of operation which terminates in the infusion of the coffee in the container and the dispensing of the infusion into one or two cups or similar receptacles 151 shown in chain-dot lines in Figure 6.

At the commencement of the said cycle of operation, the container 43, which is provided with a coffee dispensing nozzle 150 and is charged with used coffee grounds, is clamped to the lower end of the infusing and dispensing mechanism 55 (see Figure 6) by a collar 47 carried by and rotatable about the said end; the collar also encircles and is locked to the mouth of the container which is carried in the forked end 56 of a lever 57 pivoted about a pin 58 in the forked head of a spigot 59; further, the collar is provided with a radially projecting lug 48 which is pivotally connected by a pin 49 to the outer end of the piston rod 46 of the double-acting servomotor cylinder 44 incorporated in the securing and releasing mechanism; the said cylinder is pivoted upon a pin 50 (see Figure 5) extending between columns 51 secured to a portion 52 of the main frame of the machine. Fluid from the supply duct 21 is adapted to be fed to and exhausted from the cylinder ends on opposite sides of the piston 45, through pipes 53 and 54 respectively, each pipe being in communication with the discharge duct 24 of a different pair of inlet and exhaust valves 10, 13. The cam discs actuating the said valves are arranged to open the inlet valve through which the fluid is supplied to the cylinder by the pipe 53 and the exhaust valve through which spent fluid is exhausted from the cylinder by the pipe 54, at the commencement of the cycle of operations of the machine, with the result that the piston rod 46 is forced outwardly of the cylinder 44, and the collar is turned around the mouth of the container; this turning movement releases the engagement between the collar and the mouth so that the container is free to be lowered and removed from within the collar.

To enable the container to be so lowered, the end of the lever 57 opposite to the fork 56, is pivotally connected, by a pin 60, to the outer end of the rod 62 of the piston 61 which is located within the single-acting servomotor cylinder 64 of the lifting and lowering mechanism and is loaded by a compressed coil spring 63; the cylinder 64 is pivoted upon a bracket 163 extending radially from and fast with the spigot 59, and is provided with a pipe 65 which communicates with the discharge duct 24 of a third pair of valves. The cam disc corresponding to the said third pair of valves is adapted to unseat the exhaust valve 13 thereof immediately the container has been released from the collar, so as to exhaust spent fluid through the pipe 65 thereby enabling the piston to be spring driven lengthwise of the cylinder and impart anticlockwise movement (as shown in Figure 6) to the lever 57.

The spigot is rotatable about its longitudinal axis within a hub 66 forming part of a carriage 68 mounted between and slidable lengthwise of two parallel rails 69, 70, and is loaded by a tension spring 67 provided to retain an ear 83 which projects from bracket 163 against an adjustable stop 84 carried within an eyed projection 85 on the carriage.

The rails are secured to and between the sides 81 of a sub-frame which is fixed within the main frame, and one of the said sides is provided with a rod 82 which is disposed below and parallel to the rail 69 and is located in the plane of, and projects towards, a laterally projecting ear 164 on the opposite side to the ear 83.

Figure 5:
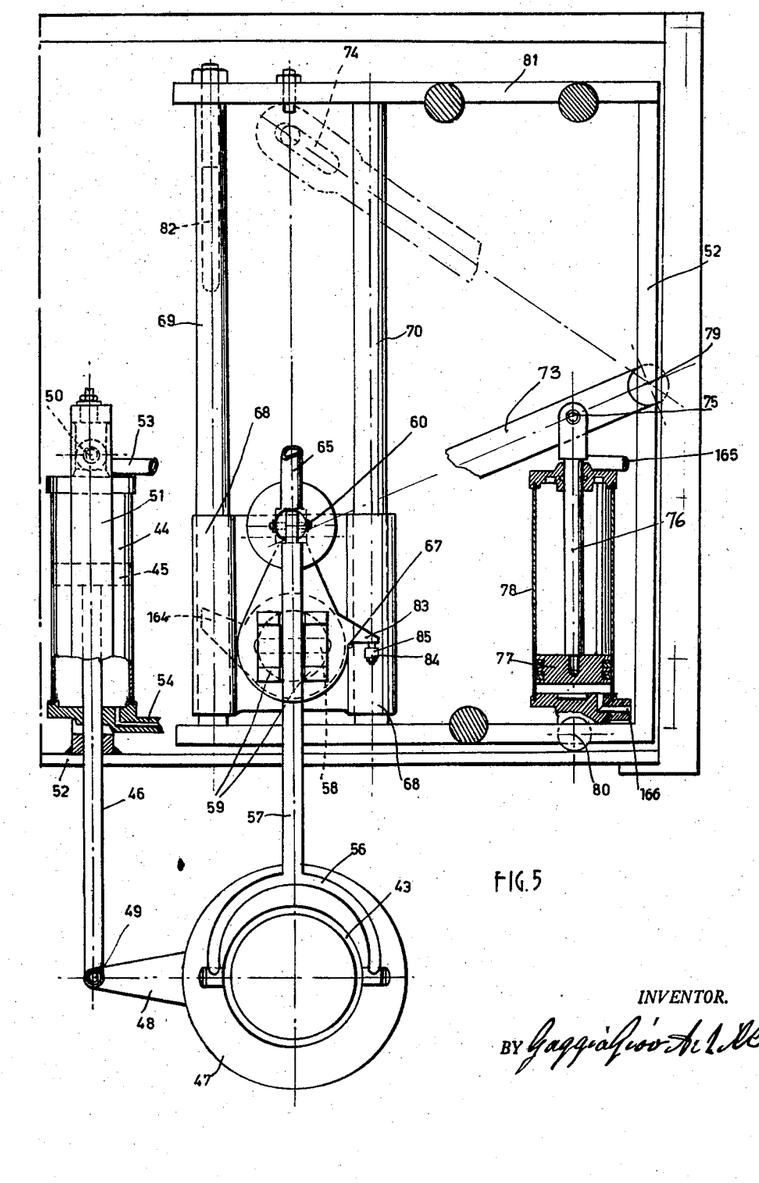
Figure 5 is an enlarged scale view of another part of the machine shown in Figure 1.

A slot 74 in one end of a lever 73 is engaged by a pin 72 extending through a third ear 71 projecting from the hub below and parallel to the bracket 163; between its ends, this lever is pivoted about a pin 75 carried in the outer end of the rod 76 secured to the piston 77 of the double-acting servomotor cylinder 78 incorporated in the transfer mechanism; the end of the lever opposite to the said slot 74 is pivoted to the sub-frame 81 at 79 whereas the cylinder 78 is pivoted to the said sub-frame at 80. The opposite ends of the cylinder are in communication through pipes 165, 166 respectively, with the discharge ducts 24 of a fourth and fifth pair of valves 10, 13 and the operating cam discs of the said valve pairs are adapted to admit fluid under pressure to the cylinder through the pipe 166 and exhaust spent fluid from the cylinder through the pipe 165, after the container 43 has been lowered from the collar 47. This operation forces the piston 77 and rod 76 outwardly of the cylinder 78 with the result that the lever 73 is swung clockwise (as shown in Figure 5) about the pivot 79 and the carriage 68 is traversed along the rails towards the rod 82. Towards the end of the travel of the carriage, the ear 164 impacts the said rod so that, as the carriage movement continues, the spigot is rotated anticlockwise within the hub 66 and carries the forked end of lever 57 and the container 43 from below the infusing and dispensing mechanism to the underside of a stationary table 86 (see Figures 7 and 9), whereupon fluid under pressure is fed through the pipe 65 to the interior of the cylinder 64 of the lifting and lowering mechanism to raise the mouth of the container into a table opening 87 where the container rim seats upon and is sealed by a resilient washer 88.

Said stationary table 86 supports a sliding reciprocable plate 89 having two apertures 90, 95 adapted to be brought into register alternately with the apertures of stationary table by displacement of the said plate. The container emptying mechanism is fixed upon the plate above the aperture 95 and the compressing mechanism is pivoted on the table between the said emptying mechanism and a container recharging mechanism fixed upon a pedestal 112 secured on and in spaced relationship to the stationary table on the opposite side of the table aperture to the emptying mechanism. The pedestal is spaced from the table by a distance such that the plate is able to slide in the clearance so as to take the plate aperture 90 into register with the open underside of a caddy 108 fixed within an aperture in the pedestal, the said underside being closed by the plate until such registration takes place. The plate apertures are spaced apart by a distance equal to the distance between the table aperture and the caddy so that when the aperture 95 registers with the table aperture, the aperture 90 registers with the caddy.

The plate is adapted to be reciprocated by a servomotor comprising the double-acting cylinder 93 which is mounted upon one edge of the table, accommodates a piston 94 and a rod 92 extending from the said cylinder towards the caddy-supporting pedestal, and is provided at its opposite ends with fluid pipes 167 and 168 respectively; the outer end of the piston rod is anchored to the plate by a bracket 91 and the pipes 167, 168 are in communication respectively with the discharge ducts 24 of a sixth and seventh pair of valves 10, 13.

The single-acting servomotor cylinder 106 of the extracting mechanism, is secured upon a base plate 169 which is fixed upon and in spaced relationship to the reciprocable plate 89, a cylindrical housing 96 being clamped between the said plates in co-axial relationship to the aperture 95, and the head of the cylinder 106 being provided with a fluid-conducting pipe 170 which is in communication with the discharge duct 24 of an eighth pair of valves 10, 13.

The piston 107 housed within the cylinder 106 is fast upon a co-axial sleeve 105 which extends through and is slidable in the cylinder head and the base plate 169, its end which projects through the cylinder head being anchored to a head plate 100. The head plate is slidable upon and between a pair of parallel guide rods 101, 102 projecting perpendicularly from the reciprocable plate, each rod being surrounded by a coil spring 103 and 104 respectively, whereby the said head plate is supported. An electric motor 99 is mounted on and above the head plate, the motor shaft being located co-axially of the sleeve 105 and being drivably coupled to a shaft 98 which passes through and is rotatable within, but is prevented from axial movement relatively to, the sleeve and extends into the housing 96 where it is provided with an extractor screw 97.

Hence, when fluid under pressure is fed into the cylinder 106 through the pipe 170, the piston 107 is forced downwardly and carries with it the sleeve 105, shaft 98, head plate 100, motor 99 and screw 97, the movement being resisted by the springs 103, 104 which return the piston to its initial position when the corresponding exhaust valve 13 is unseated.

A compressing mechanism comprising a casing 131 to the top and co-axially of which the single-acting servo-motor cylinder 132 is secured, is provided with a radially projecting web 171 which is pivoted at 109 upon the opposite side of the table to the cylinder 93. The web is loaded by a spring 110 which tends to retain the casing in the extreme full line position shown in Figures 7 and 9 but is adapted to be swung between the said extreme position and an alternate extreme position 111 indicated by the chain-dot lines in Figure 7, as the plate 89 is reciprocated upon the table.

A piston 133 housed within the cylinder 132, is fixed to a smaller piston 134 housed within an auxiliary cylinder 137 by the piston rod 135; the piston 133 is loaded by a coil spring 140 compressed between its underside and the bottom of the casing, whereas the piston 134 is loaded by a coil spring 138 compressed between its underside and a disc 136 secured to the underside and concentrically of the auxiliary clinder. The said auxiliary cylinder is located concentrically within and is displaceable axially relatively to the casing when the spring 138 is compressed to a greater degree; the axial displacement is effected by supplying fluid under pressure to the interior of the servomotor cylinder through a pipe 139 which is in communication with the discharge duct 24 of a ninth pair of valves 10, 13, so as to drive the piston 133 against the action of the spring 140.

Figures 9, 10:
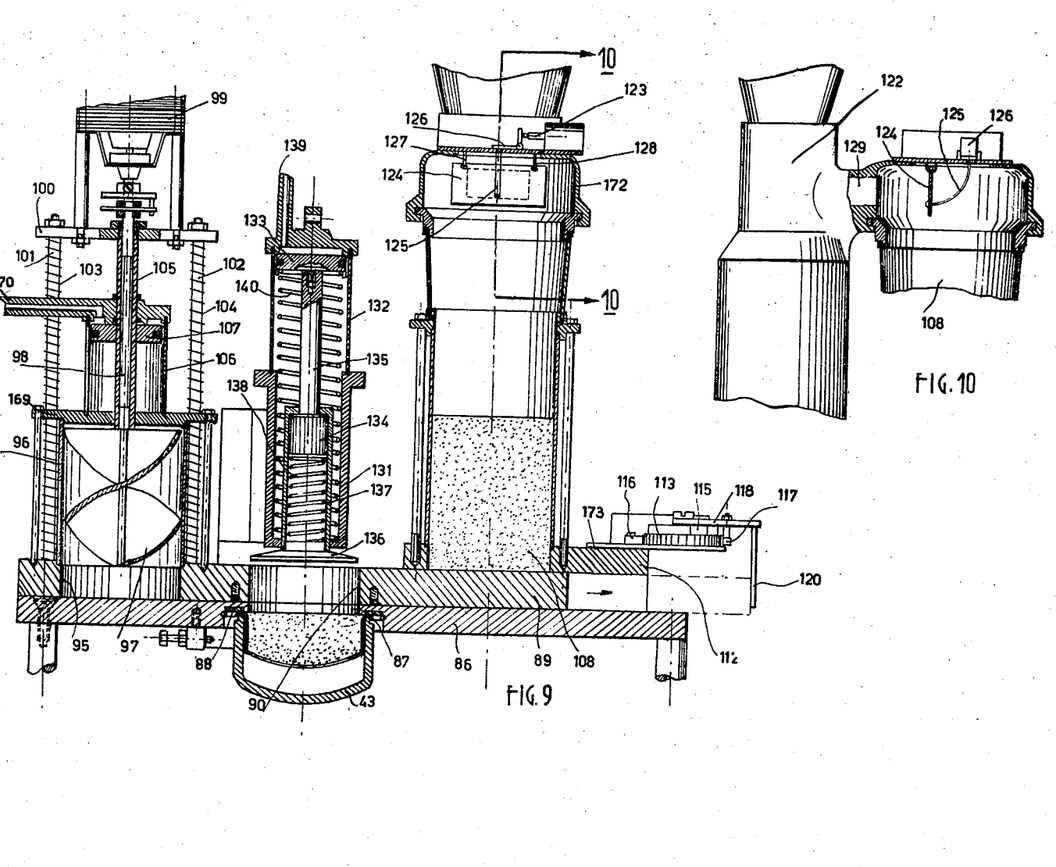
Figure 9 is a section, on an enlarged scale, along the line 9—9, Figure 7.
Figure 10 is a section along the line 10—10, Figure 9.

The coffee caddy 108 is surmounted by a cowl or chamber 172 in the crown of which a flap 124 is suspended from a pair of hooks or eyes 127, 128 (see Figures 9 and 10). The flap is disposed at the level of an orifice 129 in a coffee bean grinder 122 supported by the table 85, is arranged to swing towards and away from the said orifice, and is provided with an arcuate switch-operating link 125 which passes through the crown of the cowl into abutment with one arm of a pivoted angle-member 126; the other arm of the said angle member abuts the operating member of a switch 123.

A bracket 173 fixed to and projecting beyond the pedestal 112, has a ratchet wheel 113 rotatably mounted thereon, the said wheel being held against anticlockwise rotation (Figure 7) by a pawl 116 and being rotatable in the reverse direction by a pawl 117 pivoted upon a lever 118 of which one end is capable of being oscillated about the axis of the wheel. A disc 114, having two diametrically opposed cam lobes 115 and 174 on its periphery, is superimposed on and is made fast to the ratchet wheel, the said lobes being adapted, by virtue of the rotation of the ratchet wheel, to be brought into abutment alternately with the operating member 121 of a remote control switch for displacing the said member and closing the switch to start the grinder. The arm 118 projects beyond the wheel periphery, is loaded by a spring 119 tending to swing it clockwise, and, at its free end, has a finger 120 fixed thereto, the said finger depending into the path of travel of the reciprocable plate 89.

An adjustable stop 130 is provided on the table 89 in the path of travel of the bracket 91 and the said stop is so adjusted that as the bracket reaches the end of its movement away from the cylinder 93, the leading edge of the plate 89 impacts and displaces the finger 120 so as to swing the arm 118 anticlockwise through an angle sufficient to turn the ratchet wheel and its associated cam disc through a distance equal to the pitch of the ratchet teeth; the arm is spring-driven in the reverse direction when the plate 89 moves away from the finger so that the pawl 117 engages the next adjacent ratchet tooth preparatory to imparting an identical movement to the wheel and disc assembly. Hence, the said assembly is rotated intermittently in a succession of equal angular steps.

As the container 43 is inserted into the table aperture 87, fluid under pressure is fed to the cylinder 93 through the pipe 167 whilst spent fluid is exhausted through the pipe 168 so that the plate is driven to the right (Figure 7) to the limit determined by the stop 130. This plate movement brings the aperture 95 into register with the table aperture 87 and the aperture 90 into register with the open underside of the caddy so that ground coffee from the caddy falls into and fills the said aperture 90. As the said registration is effected, the flow of fluid to the cylinder 93 is terminated, and fluid under pressure is fed to the cylinder 106 of the emptying mechanism to lower the screw through the apertures 95 and 87 into the interior of the container. The motor 99 is started automatically by any known and suitable device (not shown) as the container enters the table aperture 87; therefore the screw is rotating when it is lowered into the said container and immediately discharges the used contents from the container into the housing 96.

Spent fluid is exhausted from the cylinder 106 whereupon the screw is raised wholly into the said housing and the supply and exhaustion of fluid to and from the cylinder 93 is reversed with the result that the plate 89 is returned to the position shown in Figure 9, the measured volume of coffee grounds is fed into the container from the aperture 90, and the compressing mechanism is swung back to its initial extreme position to locate the disc 136 above and in register with the said aperture. Fluid under pressure is then fed into the cylinder 132 through the pipe 139 to depress the pistons 133 and 134; the depression of the latter piston tends further to compress the spring 138 with the result that the disc and auxiliary cylinder 137 are lowered to take the said disc into contact with the coffee grounds now in the container; the downward travel of the pistons continues to the limit of their strokes so that the spring 138 and therefore the container contents are compressed to a predetermined degree. The pistons are then withdrawn under spring action by unseating the corresponding exhaust valve 13 to enable the spent fluid to be exhausted from the cylinder 132, whereupon spent fluid is exhausted from the cylinder 64 of the lifting and lowering mechanism to remove the container from the table aperture, the flow of fluid under pressure to and of spent fluid from the cylinder 78 is reversed so as to return the carriage 68 along the rails 69, 70, whereupon the spigot 59 is rotated by the spring 67 to take the charged container to its initial position below the infusing and dispensing mechanism, fluid under pressure is fed to the cylinder of the lifting and lowering mechanism to raise the mouth of the container into the collar 47, and the latter is rotated to relock the container in the collar by reversing the flow of fluid to and from the cylinder 44 through the pipes 54, 55 respectively.

Having relocked the container, a predetermined quantity of hot water is fed to the container, through the charge of fresh coffee grounds, and the resulting brew is discharged through the nozzle 150 into the receptacle 151 which has been placed in position upon a shelf 152 fixed upon a further portion 153 of the main frame. The water is heated, measured and discharged by the infusing and dispensing mechanism 55; to this end, the said mechanism comprises two superimposed, co-axial cylinders 146, 149 of different diameters, two pistons 143, 142 accommodated within the said cylinders 146 and 149 respectively, a rod 144 extending between and secured by its opposite ends to the said pistons, and a coil spring 145 which is housed within the lower and smaller diameter cylinder 149 around the rod 144 and is located between the underside of the upper and larger diameter cylinder and the small piston 142.

The small diameter cylinder is enclosed within a shell 175 around the lower end of which the collar 47 is rotatably mounted and which is formed with a radially projecting water reservoir 176; the said reservoir is closed by a cover 141 secured within the frame portion 153 upwardly of the shelf 152, a thermostatically controlled electric immersion heater 177 being so fixed within the cover crown that it extends into and logitudinally of the reservoir. A water supply pipe 178 also extends through the cover crown and communication between the reservoir and the lower cylinder is adapted to be established through a port 148 which, except when the mechanism is actuated, is masked and closed by the piston 142.

The upper cylinder is provided with a pipe 147 which is connected to the discharge duct 24 of a tenth pair of valves 10, 13. Hence, when the cam disc 1 which controls the said tenth pair of valves, unseats the inlet valve 10 thereof, fluid under pressure is fed to the larger cylinder 146 to lift the two pistons (142, 143) against the action of the spring 145, thereby opening the port 148; the water in the reservoir is heated to and maintained at a predetermined temperature by the immersion heater and the opening of the port enables the water to flow from the reservoir to the underside of the smaller piston, through the coffee in the container 47 and out of the spout 150 into one or two receptacles 151; the spring driven return movement of the pistons (permitted by the unseating of the corresponding exhaust valve 13) closes the port 148 and expels any water remaining in the cylinder below the smaller piston, the said return movement being so timed by the cam disc that a predetermined volume of water is allowed to flow from the reservoir to the receptacles 151.

It will be appreciated that during each cycle of operations (terminating in the said infusing and dispensing stage), a measured amount of coffee is removed from the caddy and the ratchet wheel and cam plate assembly 113, 115 is turned by the reciprocable plate 89 through an angle equal to the pitch of the teeth on the said wheel. As a consequence the level of the ground coffee in the caddy falls gradually, and one or other of the cam lobes 115, 174 moves in a succession of steps towards the operating member of the remote control switch 121. As soon as the said member is impacted by one of the said lobes, the switch is closed and the grinder 122 commences to grind coffee beans and feed the ground coffee through the orifice 129 into the caddy. The level of the coffee therefore rises, eventually reaching a level where it contacts and swings the flap 124 away from the said orifice and turns the angle member 126 in the direction which actuates the switch 125 whereby the grinding operation is terminated. As a consequence, an ample supply of freshly ground coffee is always available for feeding to the container 43.

The large cylinder 146 of the infusing and dispensing mechanism shown in Figure 6, is a single-acting cylinder; if desired, this cylinder may be replaced by the double-acting cylinder 161 shown in Figure 8, in which the said cylinder is provided at its opposite ends respectively, with fluid pipes 179 and 155, the pipe 179 being connected to the discharge duct of the tenth pair of valves 10, 13, whereas the pipe 155 is connected to an eleventh pair of such valves.

It shall be understood the invention is not limited to the specific arrangements described for purposes of illustration and changes may be made within the scope of the appended claims.

I claim:

1. An automatic coffee dispensing machine comprising, in combination, a container adapted to contain a predetermined quantity of ground coffee; infusing and dispensing means cooperating with said container for making an infusion of the coffee therein and for dispensing the infusion from said container; securing means cooperating with said container and infusing and dispensing means for releasably securing said container to the latter means; discharge means for discharging from the container ground coffee from which an infusion has been made; compressing means for compressing a fresh charge of ground coffee in said container; charging means for charging the empty container with said predetermined quantity of a fresh supply of ground coffee, said discharge means, compressing means and charging means forming part of a unit spaced from said infusing and dispensing means; moving means operatively connected to said container for moving the same between said unit and said infusing and dispensing means; and at least one cam-controlled servomotor mechanism cooperating with each of said means, each mechanism including a cylinder, a piston slidable therein, an inlet valve communicating with said cylinder for supplying liquid under pressure thereto for moving the piston therein, an outlet valve communicating with said cylinder for discharging liquid therefrom after operation of said piston, and cam means cooperating with said valves for actuating the same for opening said inlet valve when said outlet valve is closed and for closing said inlet valve when said outlet valve is open.

2. An automatic coffee dispensing means as recited in claim 1 and wherein said cam means of all of said servomechanisms include a plurality of cams fixed to a common rotary shaft, said inlet and outlet valves of each mechanism having stems and a pivotally mounted lever cooperating with said stems for actuating the same and being acted upon directly by the cam means of each servomotor mechanism, and spring means cooperating with said stems for acting on the same in opposition to said lever.

3. An automatic coffee dispensing machine as recited in claim 2 and wherein each inlet valve includes a housing having an inlet duct and an outlet duct and said stem of said inlet valve controlling the passage of liquid under pressure from said inlet to said outlet duct, said housing also accommodating said outlet valve and said housing also having a discharge duct for discharging liquid under pressure and said outlet duct of said inlet valve leading to the portion of said housing with which said discharge duct communicates the valve stem of said outlet valve controlling the passage of liquid from said discharge duct to an additional duct of said housing.

4. An automatic coffee dispensing machine comprising, in combination, a container adapted to contain a predetermined quantity of ground coffee; infusion and dispensing means cooperating with said container in one position of the latter for making an infusion of the ground coffee therein and for dispensing said infusion; support means; moving means operatively connected to said container for moving the same between said support means and said infusion and dispensing means to positions respectively located at said support means and said infusion and dispensing means; and a unit shiftably supported by said support means and including discharge means for discharging ground coffee from said container, charging means for charging said container with said predetermined quantity of fresh ground coffee, and compressing means for compressing the charge of fresh coffee in said container, said unit being shiftable with respect to said container while the latter is at said support means for placing said discharge means, said charging means, and said compressing means sequentially in communication with said container, said moving means moving said container after it has a charge of compressed fresh coffee therein from said unit to said infusion and dispensing means and after the liquid coffee has been dispensed from the latter means back to said unit.

5. An automatic coffee dispensing machine as recited in claim 4 and wherein said infusion and dispensing means includes a cylinder located over and communicating with said container when the latter is at said infusion and dispensing means; a piston slidable in said cylinder, said cylinder being formed with an opening in a wall portion thereof located at a higher elevation than said container when the latter is at such infusion and dispensing means, and reservoir means adapted to contain hot water and communicating with said opening of said cylinder, said piston being movable in said cylinder upwardly beyond said opening thereof to uncover the latter so that hot water flows to said container and said piston compressing water beneath said piston between the latter and said container after said piston closes said opening during downward movement of said piston toward said container, whereby the movement of the water through the compressed charge of coffee in said container is hastened.

6. An automatic coffee dispensing machine as recited in claim 4 wherein said moving means comprises a carriage, guide means shiftably supporting said carriage, a bar pivotally supported by said carriage for turning movement about a substantially vertical axis, a rock lever pivotally carried by said bar and having one end portion supporting said container, and means for shifting said carriage back and forth along said guide means and for rocking said rock lever on said bar for moving said container upwardly into engagement with said infusion and dispensing means, then downwardly away from the latter, then to said support means, then upwardly into engagement with said support means, and finally downwardly away from said support means and back to said infusion and dispensing means.

7. An automatic coffee dispensing machine as recited in claim 4 and wherein said support means is in the form of a table formed with an opening with which said container communicates when said container is located at said support means, said shiftable unit including a plate shiftable on said table and formed with a pair of openings, said discharge means communicating with one of said plate openings to move through said table opening into said container for discharging coffee therefrom when said one plate opening is in alignment with said table opening, said charging means being carried by said table and said other opening of said plate being aligned with said charging means to receive a charge of coffee therefrom when said one opening of said plate is aligned with said table opening, said plate being shiftable after discharge of coffee from said container to a position where said other plate opening is aligned with said table opening so that the coffee in said other table opening drops into said container, and said compressing means being located over said table opening to be movable through said other plate opening when the latter opening is aligned with said table opening for compressing coffee in said container.

8. A coffee dispensing means as recited in claim 7, said compressing means being pivotally supported by said table to be turned upon movement of said one plate opening into alignment with said table opening away from its position over said table opening, and spring means acting on said compressing means for returning the latter to its position over said table opening when said other plate opening is aligned with said table opening.

9. An automatic coffee dispensing machine as recited in claim 4 and wherein said compressing means is turnably carried by said support means for movement to and from an operating position where said compressing means is capable of compressing a fresh charge of coffee in said container.

References Cited in the file of this patent

UNITED STATES PATENTS

| | | |
|---|---|---|
| 1,390,008 | Arduino | Sept. 6, 1921 |
| 1,467,778 | Paola | Sept. 11, 1923 |
| 1,805,159 | Bauer et al. | May 12, 1931 |
| 2,014,325 | Grilli | Sept. 10, 1935 |
| 2,016,281 | Harper et al. | Oct. 8, 1935 |
| 2,206,424 | Oyen | July 2, 1940 |
| 2,256,976 | Ford | Sept. 23, 1941 |

FOREIGN PATENTS

| | | |
|---|---|---|
| 485,676 | Italy | Oct. 16, 1953 |